US007820452B2

(12) United States Patent
Parkinson

(10) Patent No.: US 7,820,452 B2
(45) Date of Patent: Oct. 26, 2010

(54) TRANSPARENT ELASTOMER SAFETY SHIELD

(76) Inventor: Martin Parkinson, 6 N. Delaware Dr., Nyack, NY (US) 10960

( * ) Notice: Subject to any disclaimer, the term of this patent is extended or adjusted under 35 U.S.C. 154(b) by 1155 days.

(21) Appl. No.: 11/158,849

(22) Filed: Jun. 22, 2005

(65) Prior Publication Data

US 2005/0287048 A1 Dec. 29, 2005

Related U.S. Application Data

(60) Provisional application No. 60/582,558, filed on Jun. 24, 2004.

(51) Int. Cl.
*G01N 1/22* (2006.01)

(52) U.S. Cl. ......................... 436/181; 436/174; 422/25; 422/99; 422/102

(58) Field of Classification Search .................. 422/99, 422/102, 25; 215/12.1, 12.2, 13.1; 220/592.2, 220/592.24, 592.25, 592.26, 592.27
See application file for complete search history.

(56) References Cited

U.S. PATENT DOCUMENTS

| | | | | |
|---|---|---|---|---|
| 3,308,940 | A * | 3/1967 | Morris, Jr. | 206/306 |
| 3,825,141 | A * | 7/1974 | Campagna | 215/12.2 |
| 3,918,579 | A * | 11/1975 | Diamant | 206/306 |
| 4,332,329 | A * | 6/1982 | Scriven et al. | 220/2.1 A |
| 4,678,461 | A | 7/1987 | Mesa | |
| 4,705,085 | A * | 11/1987 | Brown | 220/592.16 |
| 5,302,344 | A * | 4/1994 | Perlman | 422/26 |
| 5,462,711 | A * | 10/1995 | Ricottone | 422/1 |
| 5,845,806 | A * | 12/1998 | Parchman | 220/739 |
| 6,652,958 | B2 | 11/2003 | Tobita | |
| 2002/0190441 | A1* | 12/2002 | Billiet et al. | 264/669 |
| 2005/0126338 | A1* | 6/2005 | Yadav | 75/255 |

* cited by examiner

*Primary Examiner*—Jill Warden
*Assistant Examiner*—Dwayne K Handy
(74) *Attorney, Agent, or Firm*—Martin Parkinson

(57) ABSTRACT

Transparent elastomer safety shields for laboratory glassware subjected to vacuum evacuation, and for electronic components, is disclosed. Removable glassware sheaths permit viewing vacuum processes while protecting personnel from implosion hazards. Removable sheaths also permit adding conventional heat transfer materials such as powders, strips, and fluids to the sheath prior to securing to the glassware to assist evaporation and sublimation procedures. Further, the addition of thermally conductive nanopowders, such as copper, aluminum, and iron to flowable polymer formulations prior to curing into a solid elastomer, provides enhanced thermal conductivity for these transparent sheaths, and for "see through" heat sink potting compounds for protective covering of electronic components.

6 Claims, 14 Drawing Sheets

TRANSPARENT ELASTOMER SAFETY SHIELD

This application claims the benefit of U.S. Provisional Application No. 60/582,558, filed on Jun. 24, 2004. This invention relates to protective coverings for laboratory glassware to be subjected to vacuum evacuation, and electrical components, and also to improved thermal conductivity for transparent elastomers employed as covering agents.

BACKGROUND

Latex and many synthetic elastomers can be fabricated so as to be transparent. This "see through" property makes these rubbery materials ideal for countless applications, as, for example, protective coatings for glassware and potting electrical components. Used in this manner each and every glassware item must be permanently covered with these coatings. Additional potential difficulties inherent in virtually all of these materials is there inability to conduct heat to any practical degree. For example, the thermal conductivity (K [w/m–k]) of polypropylene is 0.12; polyethylene is 0.46-0.50; polystyrene is 0.13; and Teflon® is 0.25. For silicone rubber the thermal conductivity is $0.330\text{-}0.515\times10^{-3}$ gr-cal/sec/cm$^2$/cm/° C. For many applications it would be desirable not only to "see through" an elastomer but also to have the elastomer actually aid heat transfer rather than acting as an insulator.

In the present invention removable transparent sheaths are disclosed for protecting laboratory glassware, as well as additional devices and methods for improved thermal conductivity of the sheaths and related coverings.

It is therefore a primary object of the present invention to provide transparent, removable glassware protective sheaths.

An additional object of the present invention is to provide transparent, removable glassware protective sheaths having enhanced thermal conductivity.

Still another object of the invention is to provide transparent, removable freeze-dry flask implosion resistant sheaths having enhanced thermal conductivity.

A further object of the invention is to provide transparent, removable flash evaporator flask implosion resistant sheaths having enhanced thermal conductivity.

Yet another object of the invention is to provide transparent elastomeric glassware protective coatings having enhanced thermal conductivity.

An additional object of the invention is to provide transparent, flowable polymer formulations having enhanced thermal conductivity.

Still another object of the invention is to provide transparent elastomeric potting formulations having enhanced thermal conductivity.

SUMMARY

These and other objects are obtained with the present invention of transparent elastomer safety shields.

An important use for elastomers are as implosion resistant covers for vacuum evacuated glassware. Traditionally x-ray tubes, television and computer visual displays, and laboratory vacuum evacuated glassware, such as flash evaporator flasks and freeze-drying flasks, have been protected against implosion hazards to personnel by wire mesh or acrylic shields, and/or by adhering an implosion resistant coating to the outer surface of the glassware. These protective coatings are usually transparent, and of necessity impose a thermal barrier on the glassware surface. Further, the coating must be applied to each and every glassware item to be protected.

It occurred that a transparent, elastomeric sheath can be made for placement over the exterior surface of suitable glassware, including flash evaporator flasks, and freeze-dry flasks.

In the case of flash evaporator flasks which are usually exposed only to heated water, sheaths can be fabricated out of various elastomers such as, for example, urethane. For more demanding applications silicone or fluorocarbon transparent elastomers can be employed. The transparent elastomer sheaths can be simply slipped over the outer surface of the flash evaporator flask to provide protection in the event of an implosion. In addition, the externally affixed sheath can aid heat transfer to the evaporative process by the addition of a heat transfer fluid between the flask and the sheath, such as Dow Corning® Fluid 200, or by adding copper or aluminum powder or strips between the flask and sheath.

With the development of nanoscale materials, in particular so called "nanopowders", it occurred that heat conductivity could be added to transparent elastomers by incorporating suitable conductive nanopowders into liquid (or at least flowable) polymer formulations prior to their being cured into an elastomeric material. For the purposes of the present invention the term "transparent" is being used as a generic expression for materials ranging from translucent to clear in optical properties. The term "nanopowder" refers to the currently accepted range of particles having a maximum length, width, or height dimension of approximately 100 nm.(nanometers), and with a minimum dimension of approximately 1 nm. (nanometer). For the purposes of the present invention, dimensions less than the wavelength of light are the critical factor.

The wavelength of light is approximately 4,000 to 7,700 angstrom units. A variety of nanopowders are currently available with maximum dimensions ranging between 10-100 nm. as determined from SSA, and therefore can be mixed in with various polymer or latex formulations intended for transparent application with little or no effect on the transparency of the final, cured elastomeric material. Currently available thermally conductive nanopowders include copper, iron, and aluminum. Available thermally conductive nanopowder oxides include aluminum oxide, antimony oxide, cerium oxide, copper oxide, indium-tin oxide, iron oxide, titanium oxide, yttrium oxide, and zinc oxide. Obviously a large additional number of thermally conductive nanopowders can also be employed to enhance thermal conductivity while maintaining transparency in latex and synthetic polymer formulations.

Incorporating thermally conductive nanopowders, such as copper and aluminum, during fabrication of the flash evaporator flask elastomer sheaths, thereby making the sheaths themselves thermally conductive, renders the sheaths doubly useful in not only serving as an implosion protector, but also actually improving the speed and efficiency of the evaporative process. And, of course, incorporating thermally conductive nanopowders into coatings to be adhered to the outer surface of the flash evaporator flask would similarly enhance the function of these traditional implosion coatings.

Freeze-dry flasks present a similar personnel hazard in use since they are routinely subjected to a high vacuum. These flasks present somewhat different problems in comparison to flash evaporator flasks in that they are often exposed to extremely low temperatures during sample preparation, and during the sublimation process. In order to preserve all important transparency and a degree of elasticity at these low temperatures the elastomeric sheaths of necessity must be fabricated in silicone or fluorocarbon elastomers. Again, in this case the sheath can assist the sublimation process by having improved thermal conductivity using silicone or fluorocarbon heat transfer fluids, or copper/and or aluminum powders or strips. Making the silicone or fluorocarbon sheaths thermally conductive, while maintaining their transparency through the use of fabricated incorporated conductive nanopowders, again makes the sheaths doubly useful as implosion hazard protectors as well as actually assisting the speed and efficiency of the sublimation process. And, again incorporating these conducting nanopowders into traditional implosion prevention glassware coatings significantly enhances the overall utility of these coatings.

An additional example of benefits to be derived from enhanced thermal conductivity transparent elastomers is for potting electrical components. Dow Corning® Heat Sink Compound 340 is a silicone material heavily filled with heat conducting metal oxides, the compound being useful for contacting and conducting heat away from electronic components such as rectifiers, transistors, and diodes, thereby extending the useful life of these components. Heat sink compounds like this are necessarily opaque, hiding or obscuring the components. Taking, for example, a silicone solventless resin, such as SYLGUARD® 186 and mixing it with an aluminum nanopowder, the SYLGUARD® resin can then be poured over electronic components and allowed to cure at room temperature. This now thermally conductive elastomer now has the added advantage of remaining transparent in its cured, rubber like state, permitting clear observation of the potted electronic components. Similarly a variety of other potentially useful flowable potting compounds can be employed, such as VIBRATHANE® B625, which can be made thermally conductive by mixing with a nanopowder such as aluminum, and then poured over electronic components, then cured into a transparent, rubbery potting compound.

DETAILED DESCRIPTION

Figure 1B:
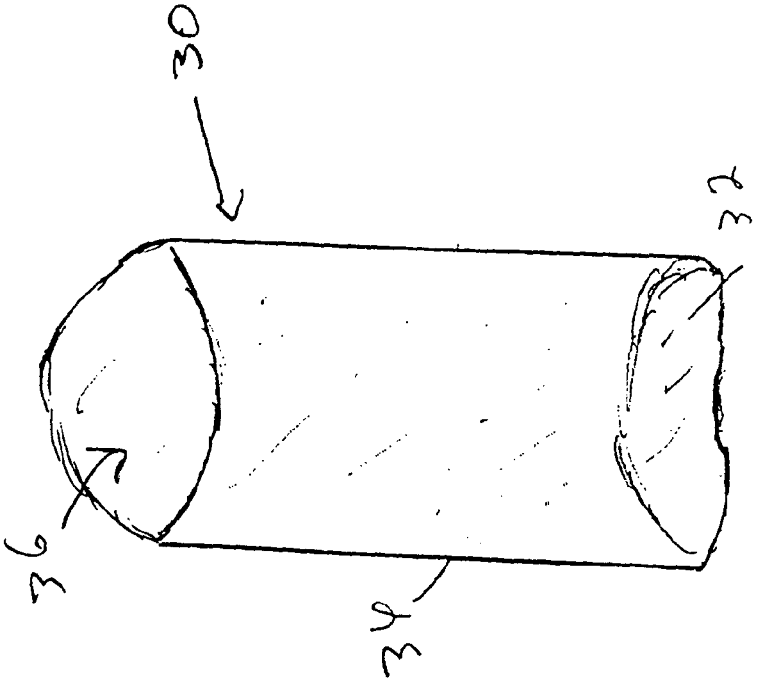
FIG. 1B is a perspective view of a transparent, formed sheath of one version of the present invention.
Figure 1A:
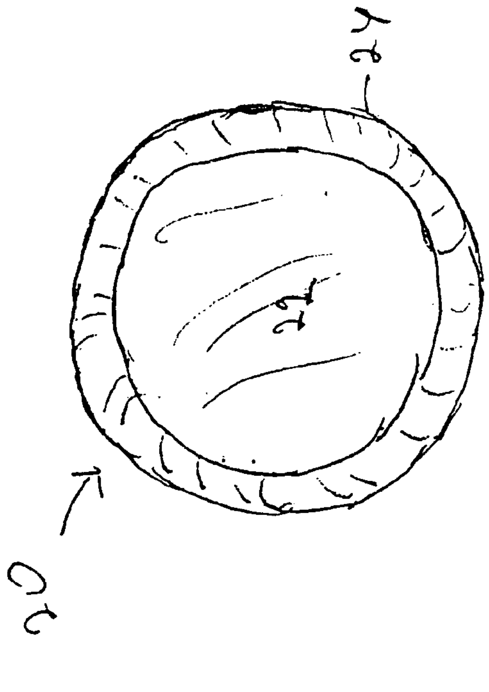
FIG. 1A is a top plan view of a transparent, coiled sheath of one version of the present invention.

Turning now to the drawings wherein similar structures having the same function are depicted with the same numerals, in FIGS. 1A and 1B two versions of transparent, elastomeric sheaths for placement over the outer surface of glassware such as flash evaporator flasks or freeze-dry flasks are illustrated. The purpose of the sheaths (20, 30) is to protect personnel from dangers due to possible implosions when these containers are subject to a vacuum. Since these containers are usually fabricated in clear, borosilicate glass it is important that the sheaths are themselves sufficiently transparent so as not to interfere with viewing the container contents. The sheaths can be fabricated from elastomers such as polyurethane, silicone, and fluorocarbon using suitable fillers and vulcanizing agents, bearing in mind the final product must be transparent. FIG. 1A illustrates a sheath 20 having a base 22 and rolled edge 24 suitable for slipping over the surface of an irregularly shaped container such as a flash evaporator flask (26-FIG. 2). FIG. 1B illustrates a formed sheath 30, having a base 32, sides 34, and an open top 36. This formed sheath can be slipped over the outer surface of a known container, as, for example, a freeze-dry flask (52-FIG. 8).

Figure 2:
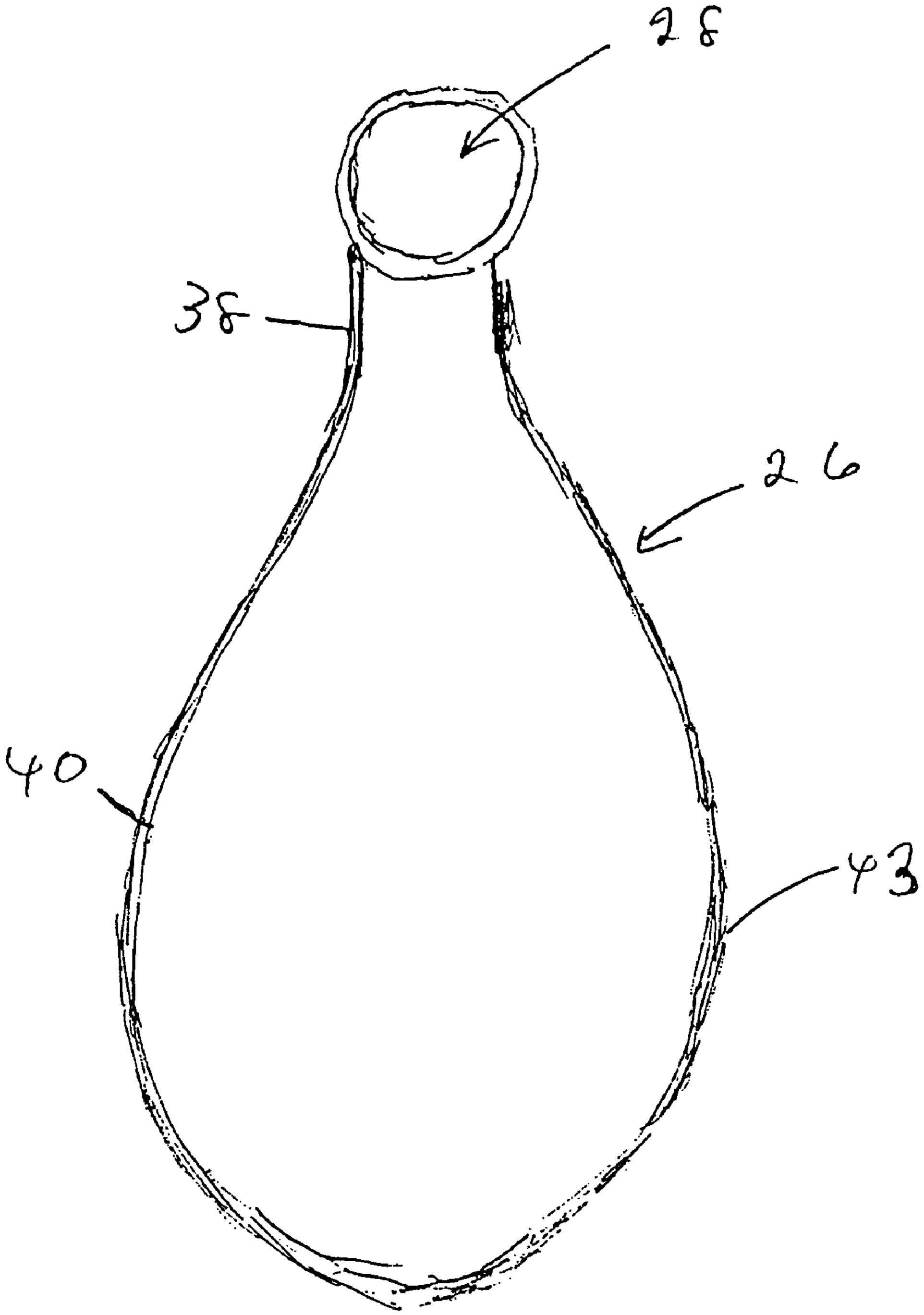
FIG. 2 is a perspective view of a typical pear shaped flash evaporator flask.

FIG. 2 illustrates a typical flash evaporator flask 26, having a narrow neck portion 38, a bulbous central area 40, and an open top 28. The flask 26 has a transparent, thermally conductive elastomeric coating 43 adhering to its outer surface. The coating can be fabricated out of, for example, a fluid polyurethane resin B 625 (available from Uniroyal Corp., 1230 Avenue of the Americas, NY, N.Y.) to which has been added a 100 nm. aluminum powder, 0.1% by weight. The resultant urethane coating is transparent yet thermally conductive, not only protecting personnel from implosion hazards, but also assisting the evaporative process by eliminating the usual insulating effect of prior elastomeric implosion resistant coatings.

Figure 3:
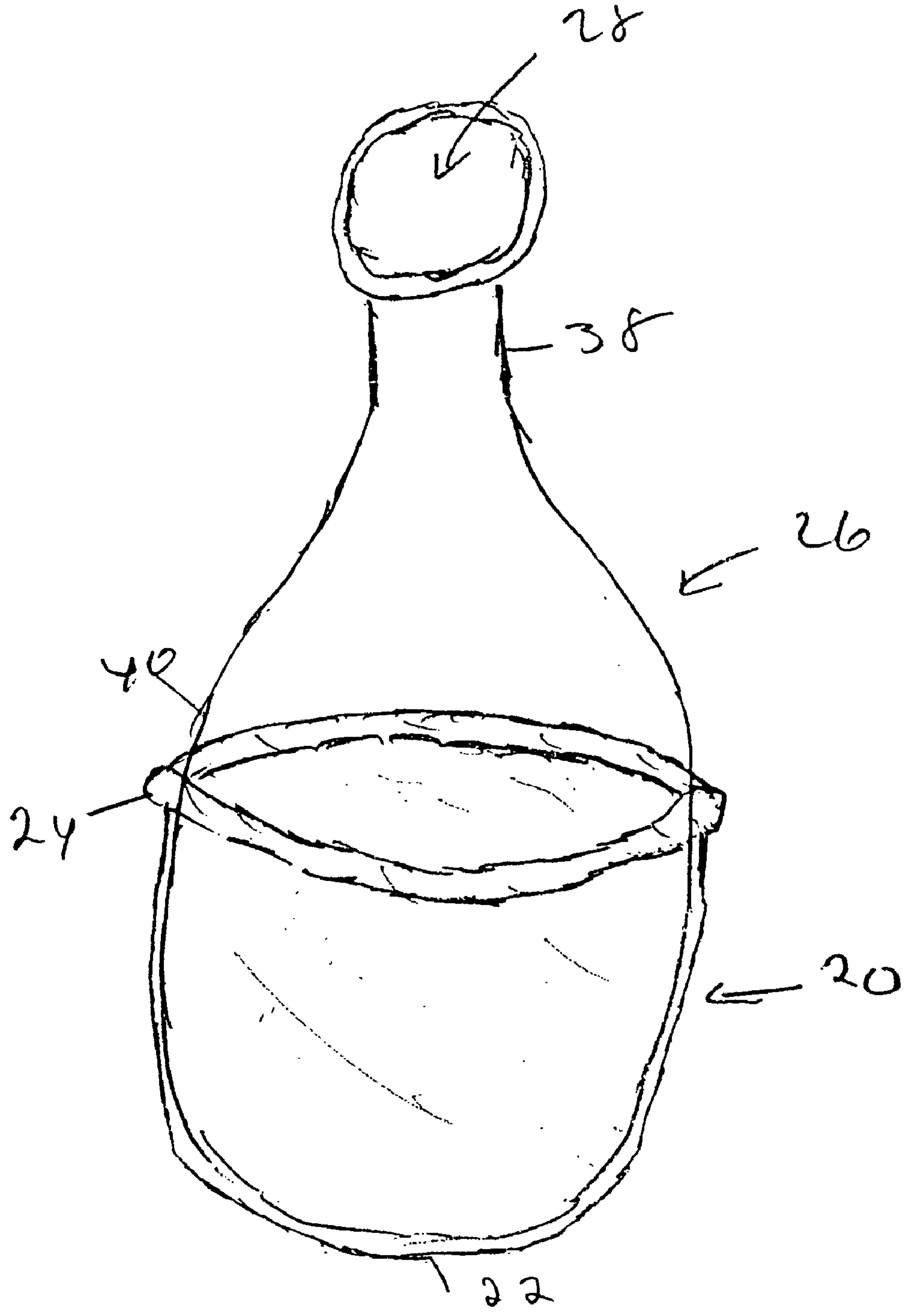
FIG. 3 is a perspective view of a typical flash evaporator flask partially covered with one version of a transparent sheath of the present invention.
Figure 4:
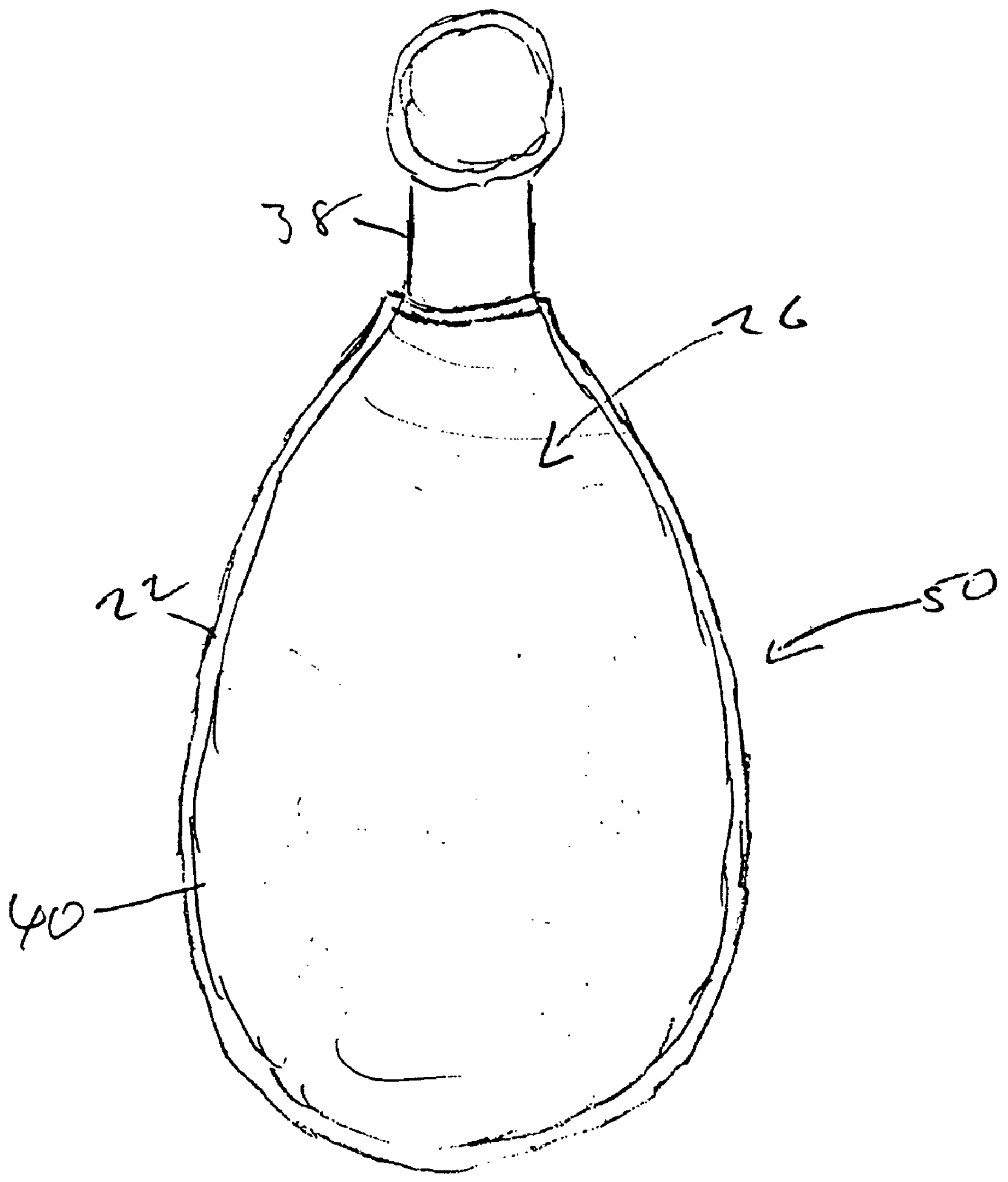
FIG. 4 is a perspective view of a typical flash evaporator flask virtually completely covered with one version of a thermally conductive transparent sheath of the present invention.

In FIG. 3 a transparent sheath 20 with rolled up edges is shown being affixed to the outer surface of a typical flash evaporator flask 26. The rubbery construction of the sheath, as, for example, urethane, silicone, or fluorocarbon elastomer depending on the proposed application, permits convenient attachment to the surface of the flask. FIG. 4 illustrates the process being complete with the sheath virtually entirely covering the flask. As depicted in FIG. 4, in this case the sheath 50 is fabricated out of a suitable elastomer which incorporates 1% by weight of a 50 nm. copper powder, thereby rendering the sheath 50 thermally conductive. The nanopowder rendered thermally conductive sheath 50 will now actually speed up the flash evaporation process while protecting personnel against implosion hazards.

Figure 5:
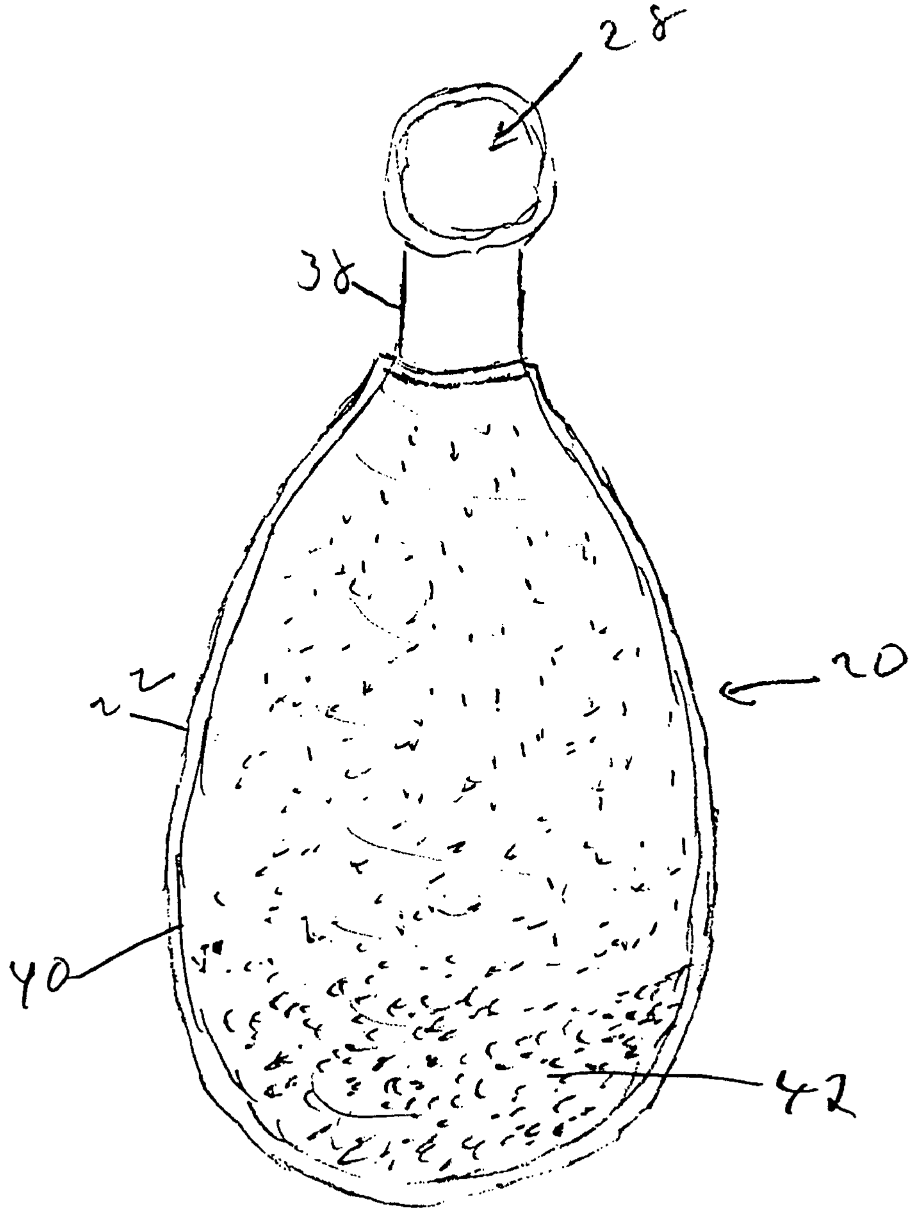
FIG. 5 is a perspective view of a typical flash evaporator flask virtually completely covered with one version of a transparent sheath of the present invention shown holding a thermally conductive powder in place.

FIG. 5 illustrates covering a standard flash evaporator flask with a rolled up edge sheath 20 containing a thermally conductive powder 42. The transparent sheath 20 is fabricated in a suitable elastomer as noted above, with the thermally conductive powder 42 being selected from a group such as aluminum, copper, or iron. The conductive powder will assist in minimizing the normally heat insulating effect of the sheath yet still permit at least a limited visibility of the evaporative process.

Figure 6:
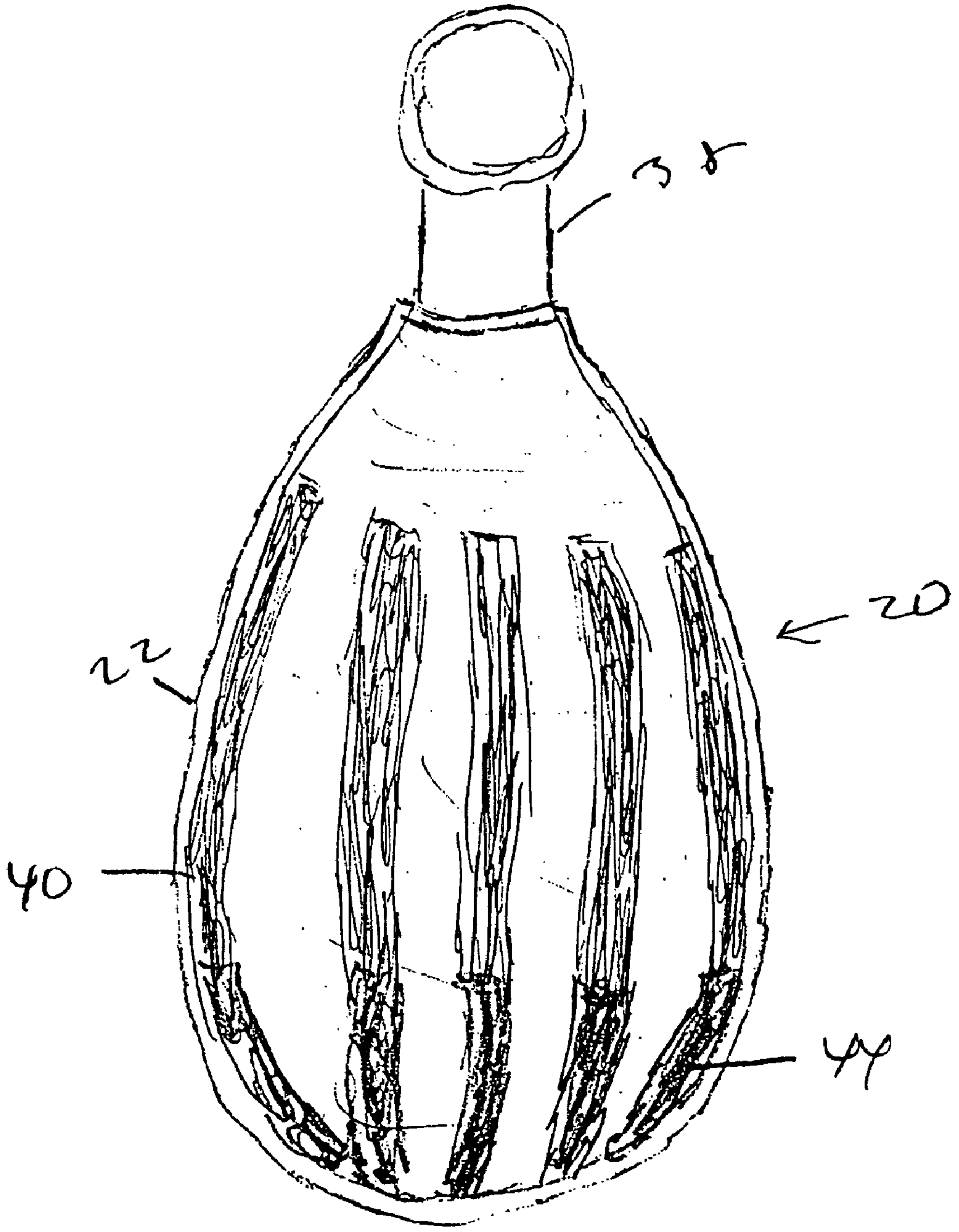
FIG. 6 is a view similar to FIG. 5, showing one version of a transparent sheath of the present invention holding thermally conductive strips in place.

A concept similar to that depicted in FIG. 5 is shown in FIG. 6 in which a standard flash evaporator flask is covered with a transparent rolled up edge sheath 20 containing strips 44 of a thermally conductive material. The strips 44 can be selected from the group consisting of aluminum, copper, or iron. Again, as in FIG. 5, the heat insulating effect of the sheath is minimized by the presence of the thermally conductive strips while still maintaining at least partial visibility of the evaporative process.

Figure 7:
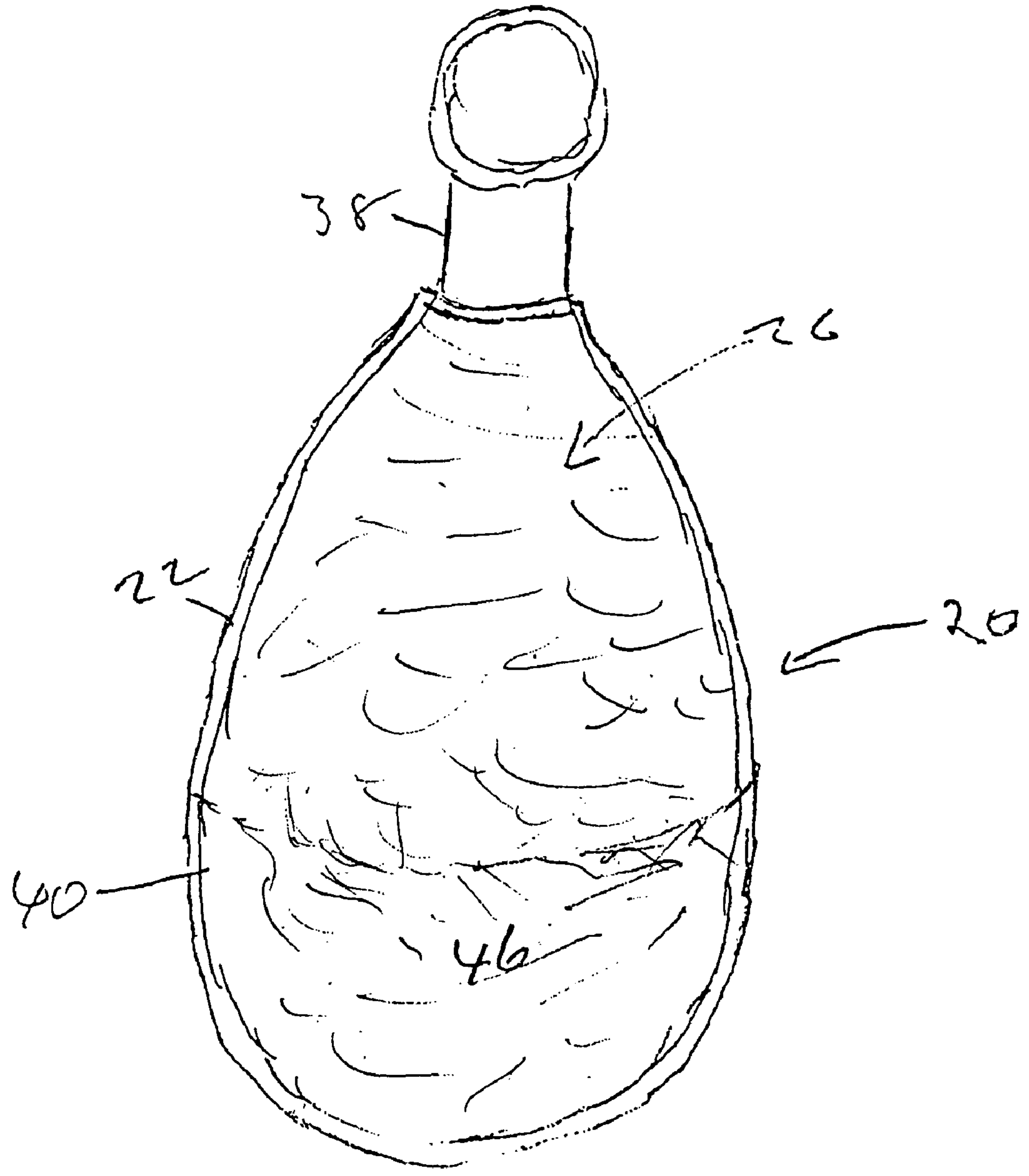
FIG. 7 is a view similar to FIG. 5, showing one version of a transparent sheath of the present invention holding a heat transfer fluid in place.

FIG. 7 illustrates an additional advantage of an implosion resistant sheath. A heat transfer fluid 46 is added to a rolled up edge sheath 20 which is then secured to a standard rotary evaporator flask. A variety of heat transfer fluids can be employed for flash evaporation where temperatures usually do not exceed 100° C. For more demanding evaporation applications fluorocarbon or silicone based heat transfer fluids, such as Dow Corning No. 510, can be employed. It is important that the fluids be transparent so as not to interfere with visibility during the evaporative process.

Figure 8:
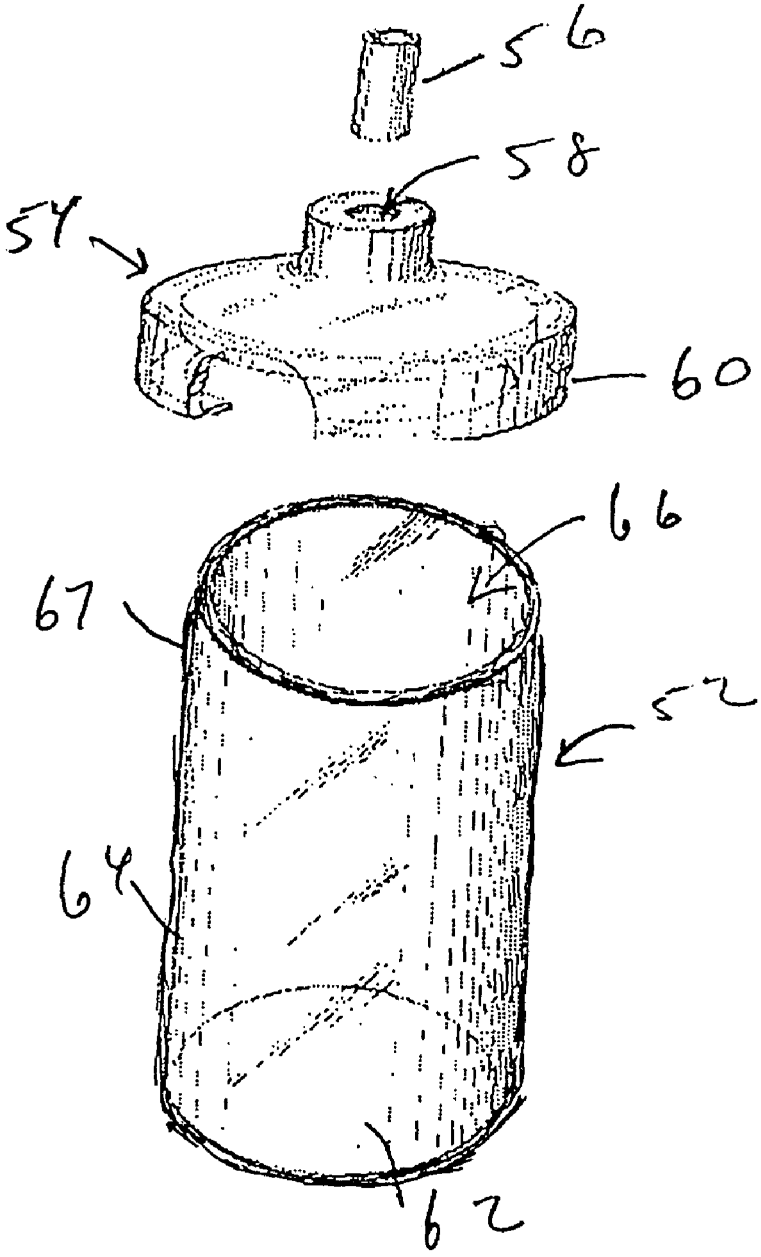
FIG. 8 is a perspective view of a typical freeze-drying flask assembly.

FIG. 8 illustrates a typical freeze-dry flask as currently being employed. The flask 52 is usually fabricated in clear borosilicate glass, having a relatively flat base 62, a straight sided 64 cylindrical shape, and a wide mouth open top 66. In operation the flask is covered with an elastomeric cap 54 having a cylindrical skirt 60 for connection to the flask 52, and a top opening 58 for accepting a connecting adapter 56. Freeze-dry flasks are subjected to high vacuum during operation, and, as noted above, may be protected against implosion hazards with an adhered anti-implosion coating, or by using acrylic screens. The freeze-dry flask has a transparent, thermally conductive coating 67 adhering to its outer surface. The coating 67 can be, for example, Dow Corning silicone adhesive sealant RTV 108, to which is added a 100 nm. copper powder, 0.2% by weight. The adhered coating provides protection to personnel against accidental implosion, and also assists the sublimation process by eliminating the usual insulating effect of implosion resistant coatings.

Figure 9:
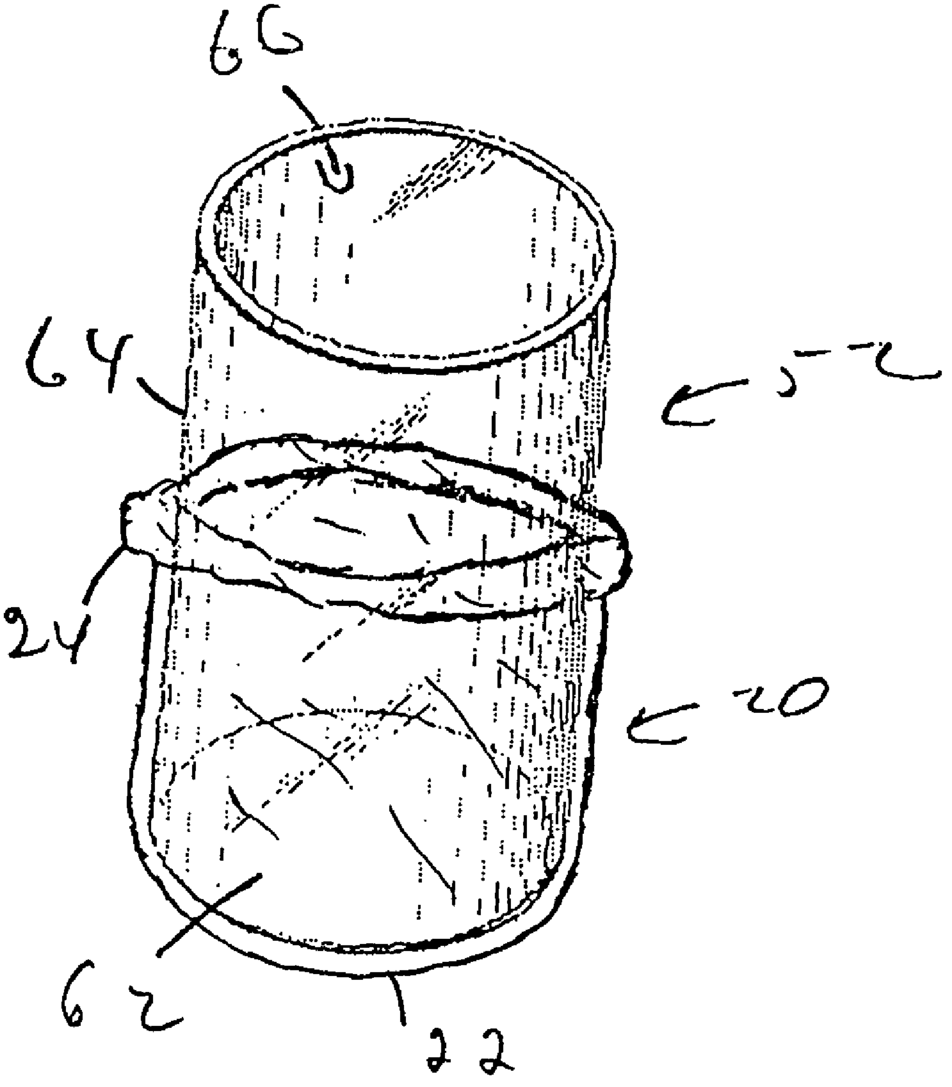
FIG. 9 is a perspective view of the typical freeze-dry flask depicted in FIG. 8 as being partially covered with one version of a transparent sheath of the present invention.

FIG. 9 illustrates a sheath 20 with rolled up edges 24 being secured to a typical freeze-dry flask. Since freeze-dry flasks are routinely subjected to extremely low temperatures of the order of −80° C. (dry ice temperature) it is desirable that sheath 20 not only be transparent, but also able to function at low temperatures, thereby making silicone or fluorocarbon elastomers the preferred material of fabrication for the sheath.

Figure 10:
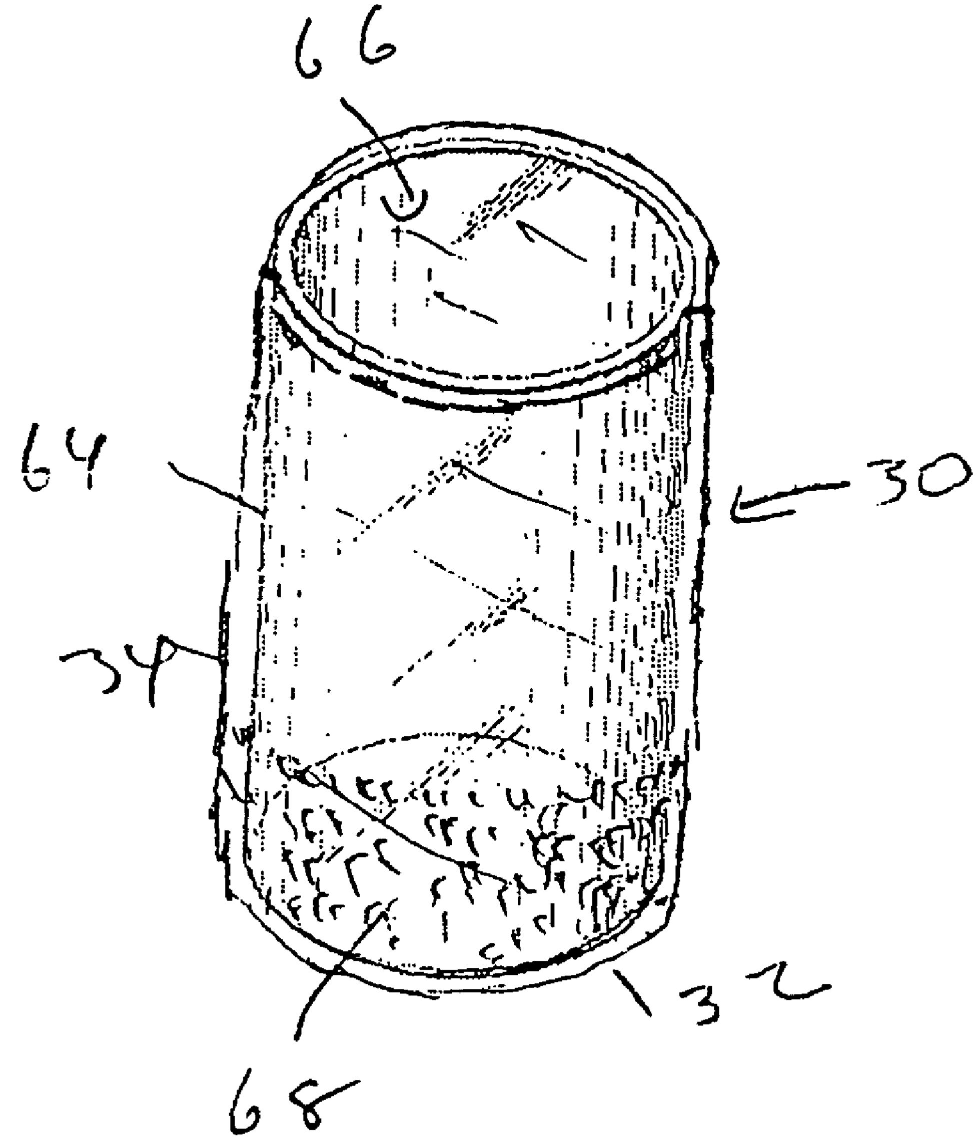
FIG. 10 is a perspective view of the typical freeze-dry flask depicted in FIG. 8 as being covered with one version of a formed, transparent sheath of the present invention shown holding a thermally conductive powder in place.

In FIG. 10 a formed sheath 30 is shown covering a typical freeze-dry flask. Again, the preferred material of fabrication for the sheath 30 is a silicone or fluorocarbon elastomer. The base 32 of the sheath 30 contains a thermally conductive powder 68 such as, for example, aluminum, copper, or iron. In contrast to the flash evaporator flask of FIG. 5, in this case it is only necessary to have the powder in contact with an external base area since the frozen sample within the flask is normally confined to this area.

Figure 11:
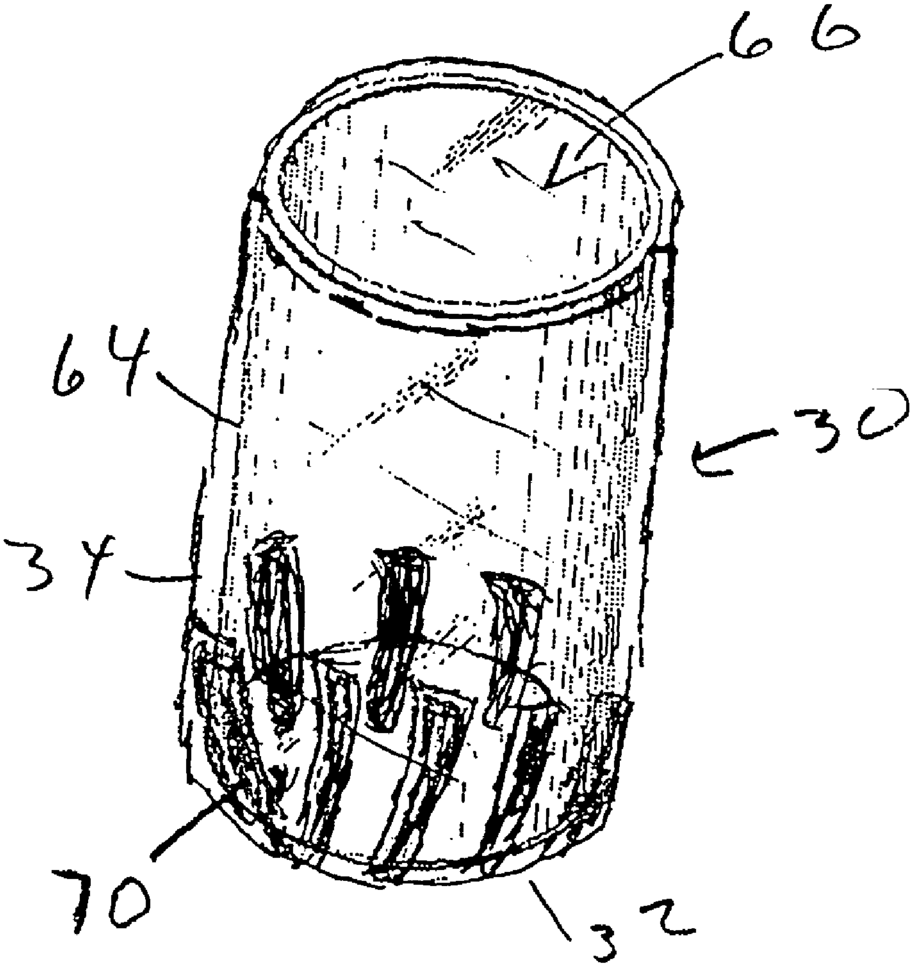
FIG. 11 is a perspective view of the typical freeze-dry flask depicted in FIG. 8 as being covered with one version of a formed, transparent sheath of the present invention shown holding thermally conductive strips in place.

Similar to FIG. 10, in FIG. 11 a formed sheath is shown covering a typical freeze-dry flask. The sheath contains strips 70 of a heat conducting material, such as, for example, aluminum, copper, or iron placed within the sheath prior to connection to the outer surface of the flask. In this manner a large degree of sample visibility is maintained during freeze-drying, while the thermally conductive strips compensate for the insulating effect of the sheath 30. Again, in contrast to the flash evaporator flask of FIG. 6, the strips 70 need interfere with visibility only at the base area of the freeze-dry flask.

Figure 12:
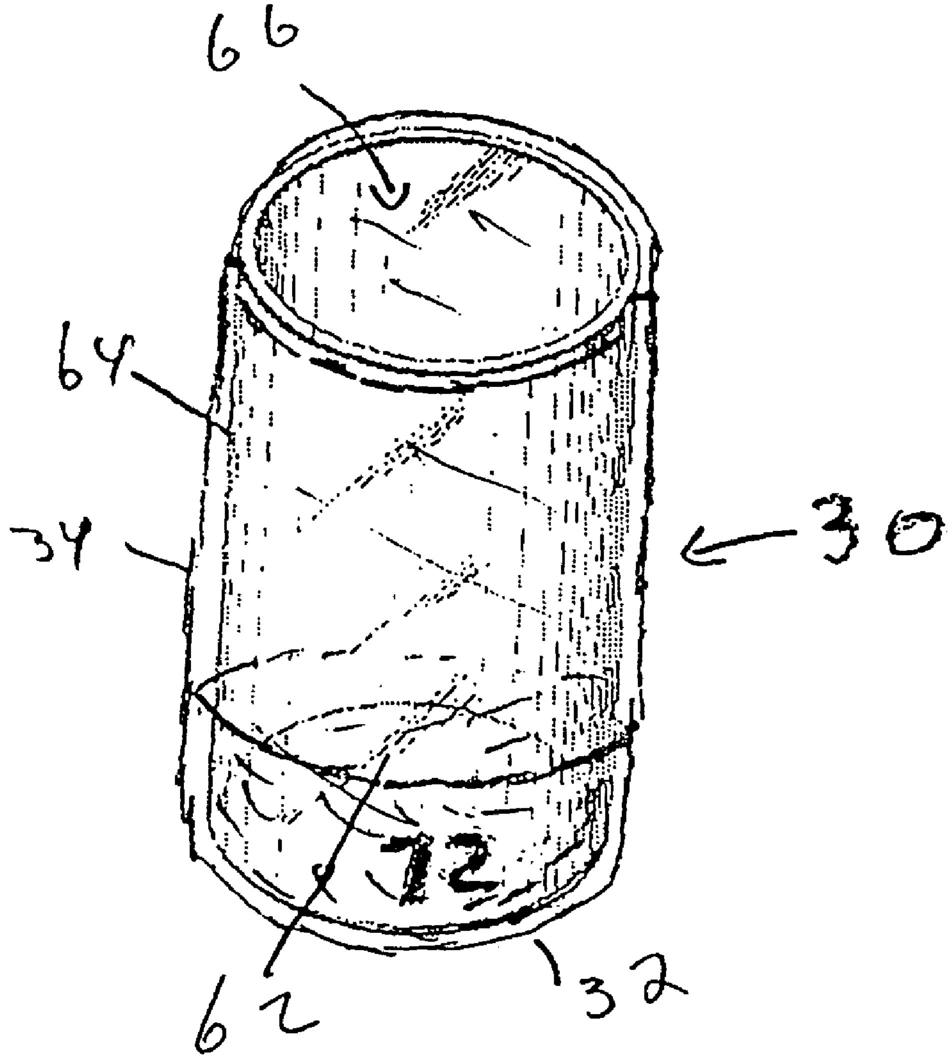
FIG. 12 is a perspective view of the typical freeze-dry flask depicted in FIG. 8 as being covered with one version of a formed, transparent sheath of the present invention shown holding a heat transfer fluid in place.

FIG. 12 illustrates a formed sheath 30 covering a typical freeze-dry flask, the sheath being partially filled with a transparent heat transfer fluid 72 prior to being secured to the flask. Since the freeze-drying sublimation process will take place at low temperatures, such as −10° C. to −40° C., transparent silicone or fluorocarbon based heat transfer fluids are preferred so as to maintain maximum visibility of the process. A suitable heat transfer fluid would be Dow Corning silicone heat transfer fluid 510.

Figure 13:
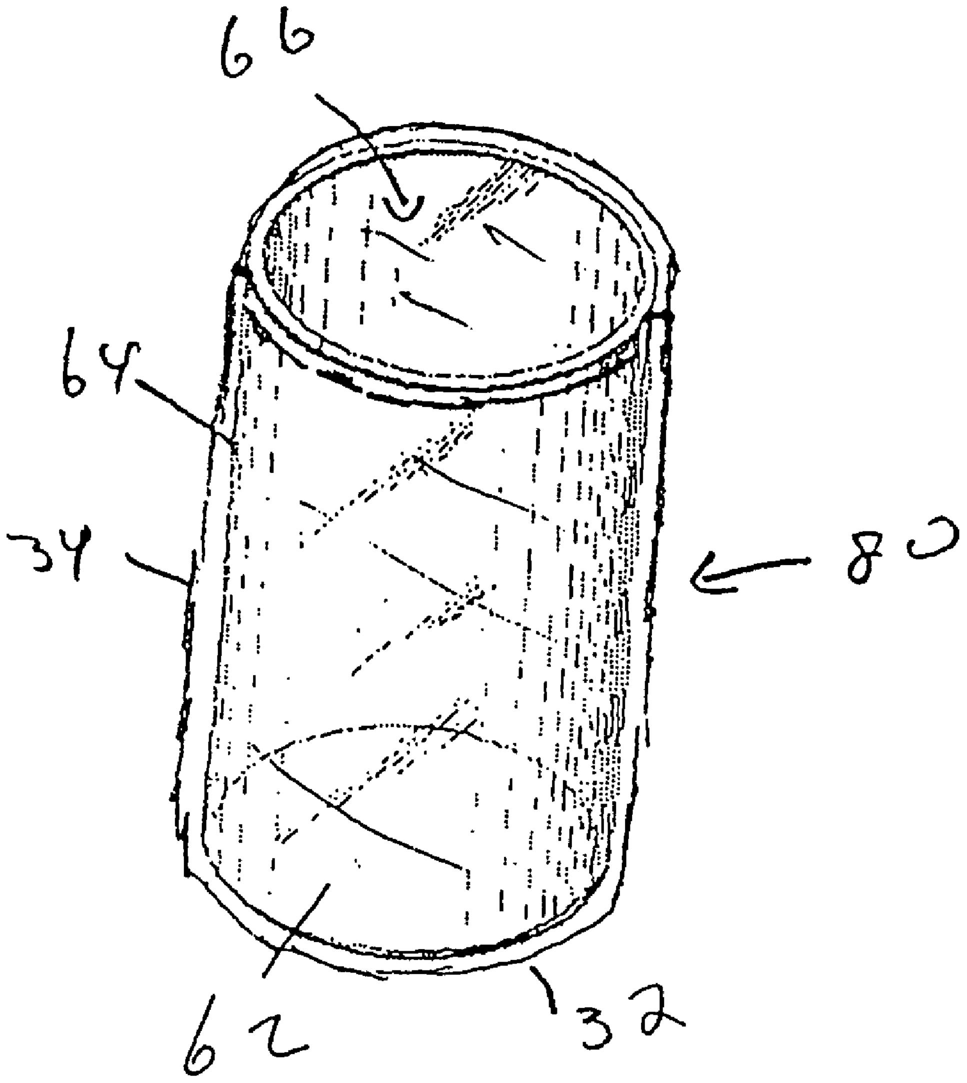
FIG. 13 is a perspective view of the typical freeze-dry flask depicted in FIG. 8 as being covered with one version of a thermally conductive, formed, transparent sheath of the present invention.

FIG. 13 illustrates a typical freeze-dry flask being protected against implosion hazards by a formed sheath 80 covering its external surface. In this case the formed sheath 80 is fabricated from a silicone or fluorocarbon elastomer to which is added a 100 nm. copper powder, 0.1% by weight. The resulting sheath 80 remains transparent since the copper nanopowder is below the wave length of light and therefore does not significantly interfere with the transparency of the sheath. Sheath 80 therefore performs the multiple functions of providing implosion protection for personnel, maintaining visibility of the freeze-dry process, and improving freeze-drying efficiency by eliminating the usual thermal insulating effect of traditional implosion resistant coatings.

Figure 14:
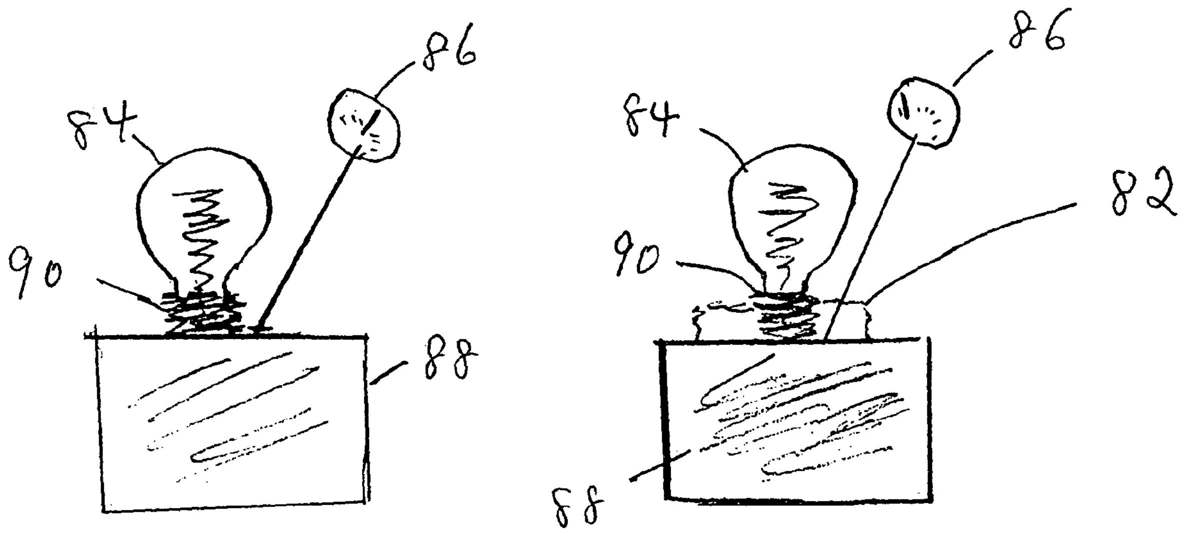
FIG. 14 is a perspective view of a pair of electric light bulbs and sockets mounted on metal blocks, one of said sockets being embedded in and therefore cooled by a thermally conductive, transparent heat sink potting compound.

In FIG. 14 a pair of light bulbs 84 with their sockets 90 being affixed to a metal base 88 is shown. A dial type thermometer 86 is affixed at the junction of the sockets 90 to the metal base. The left hand light bulb 84 is connected to an unprotected socket 90, whereas the right hand light bulb 84 is connected to a socket 90 embedded in a transparent elastomeric material 82. Elastomeric material 82 can be fabricated, for example, using a transparent, flowable silicone resin such as SYLGUARD® 186 (available from Dow Corning Corp., Midland, Mich.) mixed 9 parts to 1 with its curative agent. While in this flowable state 5 parts by weight of a 50 nm. size copper powder is mixed in. The flowable SYLGUARD 186 is then poured over the top surface of the right hand metal base 88, encapsulating the light bulb socket 90 in a transparent, flowable resin, which then cures to a solid, thermally conductive elastomer. When lighted, the left hand thermometer will indicate a temperature of approximately +110° F., while the right hand thermometer can indicate a temperature of +90° F. with the right hand bulb lighted, indicating the cooling effect of the transparent, elastomeric heat sink potting compound material 82.

Thus it can be seen that the present invention of transparent elastomer safety shields provides improved safety for personnel and sensitive equipment, while actually assisting the performance of a variety of procedures. Glassware to be vacuum evacuated can be covered with these transparent sheaths, and/or heat transfer materials added to the sheaths to expedite process evaporation or sublimation. Incorporating thermally conductive nanopowders during solid elastomer fabrication provides enhanced thermally conductive elastomer protective covers with preserved “see through” transparency.

What is claimed is:

1. A method for enhancing a vacuum evaporation or sublimation procedure while simultaneously protecting personnel from possible implosion hazards from vacuum evacuated laboratory glassware, comprising the steps of:

(a) selecting a transparent elastomer;

(b) creating a cover from said transparent elastomer having enhanced thermal conductivity due to the incorporation of a quantity of a thermally conductive nanopowder within a formulation of said transparent elastomer utilized for creating said cover, said thermally conductive nanopowder being selected from the group consisting of iron, aluminum, and copper, and having dimensions approximately between 10 and 100 nanometers so as to have no significant effect on said transparency of said elastomer;

(c) enclosing a substantial portion of an outer surface of a particular item of said laboratory glassware to be vacuum evacuated during said vacuum procedure with said cover, said particular item of laboratory glassware having an annular wall extending between a solid base area and an open top; and (d) evacuating said particular item of laboratory glassware with a vacuum pump, said cover cooperating with said glassware to expedite said evaporation or sublimation procedure while simultaneously providing "see-through" transparency and said implosion hazard protection to said personnel adjacent said glassware.

2. The method according to claim 1 wherein said particular item of laboratory glassware is a typical freeze-dry flask.

3. The method according to claim 1 wherein said particular item of laboratory glassware is a typical flash evaporator flask.

4. The method according to claim 1 wherein said transparent elastomer is selected from the group consisting of a polyurethane elastomer, a silicone rubber, and a fluorocarbon elastomer.

5. The method according to claim 1 wherein said thermally conductive nanopowder comprises between 0.1% and 5% of the weight of said formulation.

6. The method according to claim 1 wherein said thermally conductive nanopowder comprises between 0.1% and 1% of the weight of said formulation.

* * * * *